(12) United States Patent
Reepmeyer et al.

(10) Patent No.: US 11,181,409 B2
(45) Date of Patent: Nov. 23, 2021

(54) MONITORING AND CONTROL SYSTEM FOR A FLOW DUCT

(71) Applicant: General Electric Company, Schenectady, NY (US)

(72) Inventors: James Ryan Reepmeyer, Cincinnati, OH (US); Gagan Adibhatla, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 16/059,160

(22) Filed: Aug. 9, 2018

(65) Prior Publication Data

US 2020/0049540 A1 Feb. 13, 2020

(51) Int. Cl.
| | | |
|---|---|---|
| *G01F 1/692* | (2006.01) | |
| *F02D 41/18* | (2006.01) | |
| *G01F 1/684* | (2006.01) | |

(52) U.S. Cl.
CPC ............ *G01F 1/692* (2013.01); *F02D 41/18* (2013.01); *G01F 1/6847* (2013.01); *F02D 2200/0406* (2013.01); *F02D 2200/0414* (2013.01)

(58) Field of Classification Search
CPC ........ F01D 17/08; F01D 17/085; F01D 21/12; F02C 7/14; F02D 2200/0406;
(Continued)

(56) References Cited

U.S. PATENT DOCUMENTS

| 4,104,594 A | * | 8/1978 | Cann | ..................... | H03D 1/04 |
| | | | | | 329/353 |
| 4,186,605 A | * | 2/1980 | Bourigault | ............... | G01K 3/06 |
| | | | | | 374/115 |

(Continued)

FOREIGN PATENT DOCUMENTS

| EP | 1160551 A1 | 12/2001 |
| GB | 2226366 A | 6/1990 |

OTHER PUBLICATIONS

European Search Report Corresponding to Application No. 19190838 dated Dec. 6, 2019.

*Primary Examiner* — John Fitzgerald
*Assistant Examiner* — Truong D Phan
(74) *Attorney, Agent, or Firm* — Dority & Manning, P.A.

(57) ABSTRACT

A monitoring and control system for a flow duct and a method for determining a component status of an operational component disposed within a flow passage of the flow duct utilizing the system are provided. In one exemplary aspect, the system includes at least two sensors that are disposed within the flow passage and configured to sense a characteristic of a fluid flowing therethrough. The sensors may be averaging sensors. Each sensor extends circumferentially about an axial centerline defined by the flow duct. The sensors are arranged in an overlapped arrangement. Particularly, the sensors extend circumferentially about the axial centerline such that the sensors physically overlap one another circumferentially. Additionally, the sensors may be disposed within the same or substantially the same plane axially. Signals generated by the sensors may be utilized to monitor and control the fluid and various operational components disposed within the flow passage.

20 Claims, 7 Drawing Sheets

(58) Field of Classification Search
CPC ............ F02D 2200/0414; F02D 41/18; F05D 2260/213; F05D 2260/80; F05D 2270/80; G01F 1/6847; G01F 1/692; G01K 13/02; G01K 13/024; G01K 2205/00; G01K 3/06; G05D 3/16; Y02T 50/60
See application file for complete search history.

(56) References Cited

U.S. PATENT DOCUMENTS

| | | | |
|---|---|---|---|
| 4,580,910 A * | 4/1986 | Corwin | G01K 1/14 |
| | | | 374/115 |
| 4,618,268 A * | 10/1986 | Horner | G01K 13/10 |
| | | | 374/102 |
| 4,691,566 A | 9/1987 | Aine | |
| 5,106,203 A * | 4/1992 | Napoli | F01D 17/085 |
| | | | 374/144 |
| 5,438,866 A * | 8/1995 | McQueen | G01F 1/684 |
| | | | 374/E13.006 |
| 5,913,239 A * | 6/1999 | Morris, Jr. | F02D 19/027 |
| | | | 73/114.32 |
| 5,979,220 A * | 11/1999 | Zombo | F01D 17/02 |
| | | | 165/272 |
| 6,237,426 B1 * | 5/2001 | Gryc | G01F 1/46 |
| | | | 73/861.66 |
| 6,517,241 B1 * | 2/2003 | Sanderson | G01K 3/06 |
| | | | 374/179 |
| 6,592,254 B2 * | 7/2003 | Gul | G01K 3/06 |
| | | | 374/115 |
| 8,251,140 B2 | 8/2012 | Ramakrishnan et al. | |
| 9,354,158 B1 * | 5/2016 | van Dijk | G01K 7/22 |
| 9,441,598 B2 | 9/2016 | Futa et al. | |
| 9,593,590 B2 | 3/2017 | Ebert et al. | |
| 9,933,313 B2 | 4/2018 | Agrawal | |
| 2002/0196837 A1 * | 12/2002 | Gul | G01K 3/06 |
| | | | 374/148 |
| 2005/0248356 A1 * | 11/2005 | Care | G01N 27/226 |
| | | | 324/686 |
| 2007/0055464 A1 * | 3/2007 | Gysling | G01F 1/666 |
| | | | 702/50 |
| 2007/0137318 A1 * | 6/2007 | Desrochers | G01N 1/26 |
| | | | 73/863.81 |
| 2013/0013117 A1 * | 1/2013 | Desrochers | F24F 7/08 |
| | | | 700/276 |
| 2013/0259088 A1 | 10/2013 | Bellis et al. | |
| 2015/0114098 A1 | 4/2015 | Kamiya | |
| 2015/0267591 A1 | 9/2015 | Miller et al. | |
| 2016/0067546 A1 | 3/2016 | Yoshikawa et al. | |
| 2016/0208712 A1 | 7/2016 | Schwarz et al. | |
| 2019/0204129 A1 * | 7/2019 | Ball | G01F 1/588 |

* cited by examiner

MONITORING AND CONTROL SYSTEM FOR A FLOW DUCT

FIELD

The present subject matter relates generally to a monitoring and control system for a flow duct, such as e.g., a flow duct of a turbine engine.

BACKGROUND

Generally, it is desirable to sense one or more characteristics of a fluid flowing through a flow duct. For instance, sensing one or more characteristics of an airflow flowing through an annular high bypass duct of a turbofan engine may provide insight into the performance of the engine or one or more operational components thereof. For example, sensed fluid characteristics may provide insight into whether a heat exchanger disposed within the bypass duct is operating properly.

Conventional sensor arrangements for sensing fluid characteristics of a fluid flowing through a flow duct include: placing a single annular sensor along the flow passage, segmenting sensors and aligning them end-to-end circumferentially about the flow passage, and placing one or more radially extending sensors into the flow passage. While a high level of granularity or detail about the characteristics of a fluid passing through a flow duct is desirable, achieving additional granularity with such conventional sensor arrangements requires adding additional or higher fidelity sensors. Additional sensors add weight and cost to the system while higher fidelity sensors can add considerable cost to the system.

Accordingly, a system and methods of operating the same that address one or more of the challenges noted above would be useful.

BRIEF DESCRIPTION

Aspects and advantages of the invention will be set forth in part in the following description, or may be obvious from the description, or may be learned through practice of the invention.

In one aspect, the present disclosure is directed to a system for a flow duct defining a flow passage and an axial direction, a radial direction, and a circumferential direction. The system includes a first sensor extending along the circumferential direction within the flow passage. The system also includes a second sensor extending along the circumferential direction within the flow passage, wherein the first sensor extends along the circumferential direction such that at least a portion of the first sensor physically overlaps the second sensor along the circumferential direction.

In another aspect, the present disclosure is directed to a method for determining a component status of an operational component disposed within a flow passage defined by a flow duct utilizing a system. The flow duct defines an axial direction, a radial direction, and a circumferential direction. The system comprises a first averaging sensor extending along the circumferential direction within the flow passage and a second averaging sensor extending along the circumferential direction within the flow passage. The method includes flowing a fluid through the flow passage. The method also includes receiving a first signal from the first averaging sensor indicative of a characteristic of the fluid proximate the first averaging sensor. The method further includes receiving a second signal from the second averaging sensor indicative of a characteristic of the fluid proximate the second averaging sensor, wherein the first averaging sensor and the second averaging sensor at least partially physically overlap one another along the circumferential direction. Moreover, the method includes determining the component status of the operational component based at least in part on the first signal and the second signal. In addition, the method includes generating a control action based at least in part on the component status of the operational component.

In a further aspect, the present disclosure is directed to a system for a flow duct defining a flow passage for receiving a fluid therethrough. The flow duct further defines an axial direction, a radial direction, and a circumferential direction. The system includes a first averaging sensor extending along the circumferential direction within the flow passage. The system also includes a second averaging sensor extending along the circumferential direction within the flow passage. Further, the system includes a third averaging sensor extending along the circumferential direction within the flow passage, wherein the second averaging sensor extends along the circumferential direction such that at least a portion of the second averaging sensor physically overlaps the first averaging sensor along the circumferential direction and such that at least a portion of the second averaging sensor physically overlaps the third averaging sensor along the circumferential direction, and wherein the first averaging sensor, the second averaging sensor, and the third averaging sensor are positioned proximate one another along the axial direction.

In some embodiments, the flow duct is a pipe for use in a chemical process plant.

In some embodiments, the flow duct is a pipe in a petroleum refinery.

In some embodiments, the flow duct is a pipe or tube in a power plant.

In some embodiments, the flow duct is at least a portion of a core air flowpath of a turbine engine.

In some embodiments, the flow duct is an annular bypass duct of a gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
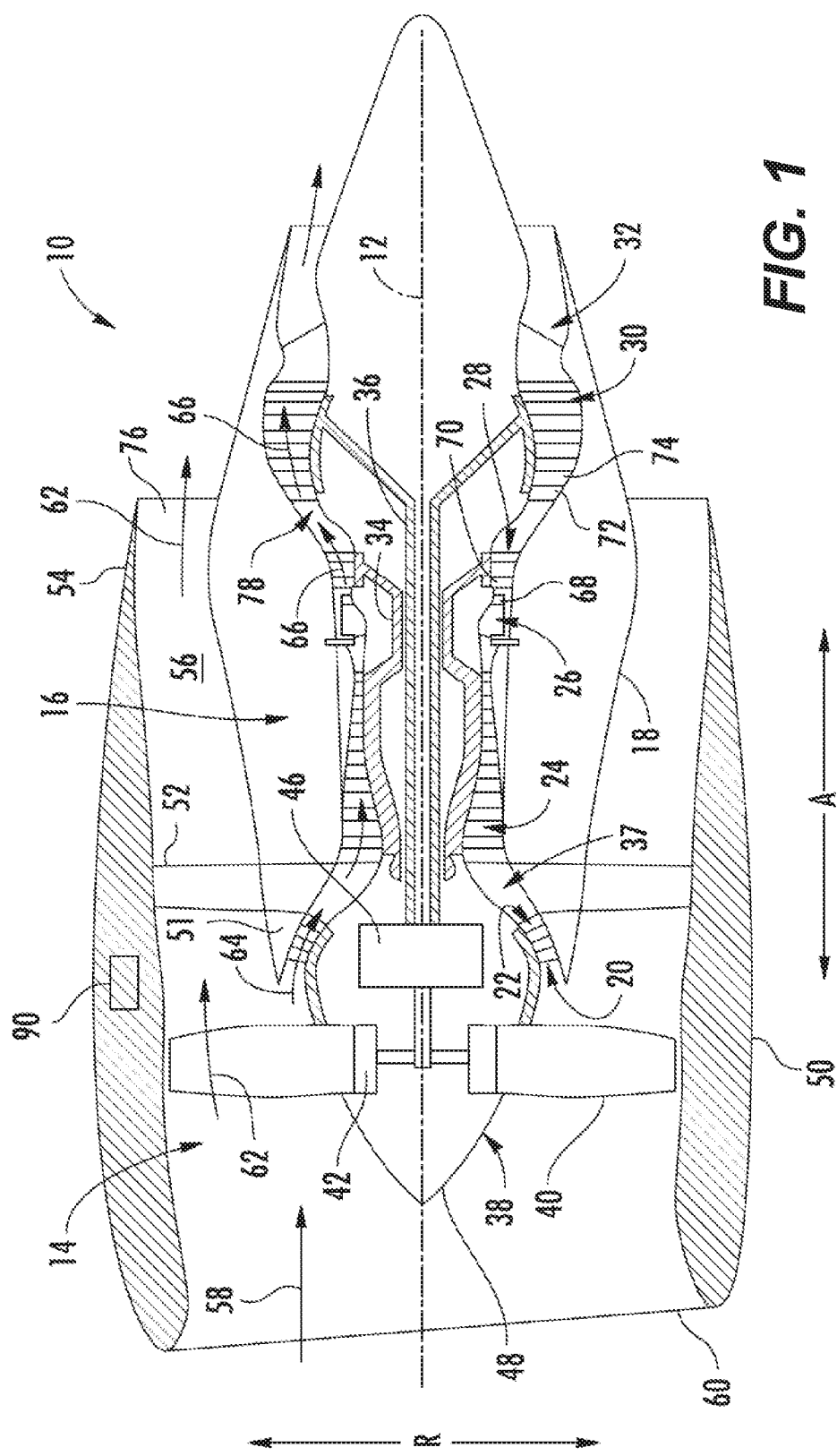
FIG. 1 provides a cross-sectional view of one embodiment of a gas turbine engine that may be utilized to produce thrust for an aircraft in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Furthermore, as used herein, terms of approximation, such as "approximately," "substantially," or "about," refer to being within a ten percent (10%) margin of error.

In general, the present disclosure is directed to a monitoring and control system for a flow duct and a method for determining a component status of an operational component disposed within a flow passage of the flow duct utilizing the system. In one exemplary aspect, the system includes at least two sensors that are disposed within the flow passage and configured to sense or measure a characteristic of a fluid flowing within the flow passage of the duct. The sensors may be averaging sensors. Each sensor extends circumferentially about an axial centerline defined by the flow duct. More particularly, the sensors are arranged in an overlapped arrangement. That is, the sensors extend circumferentially about the axial centerline such that the sensors physically overlap one another circumferentially. Additionally, the sensors may be disposed within the same or substantially the same plane axially. The overlapped arrangement of the sensors defines more sensing regions than sensors, thus improving sensing capability. Overlapped regions and non-overlapped regions defined by the sensors may be strategically aligned axially, radially, and circumferentially proximate various operational components to detect the performance of such operational components. In this way, a component state of one or more operational components may be determined and appropriate control actions may be generated accordingly to control the system. Although the inventive aspects of the present disclosure are discussed with reference generally to a turbine engine, it will be appreciated that the inventive aspects of the present disclosure may be incorporated into many different applications and may be implemented in many industries.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan 10." As shown in FIG. 1, the turbofan 10 defines an axial direction A (extending parallel to a longitudinal centerline 12 provided for reference), a radial direction R, and a circumferential direction C. In general, the axial direction A extends parallel to the longitudinal centerline 12, the radial direction R extends orthogonally to or from the longitudinal axis 12, and the circumferential direction C extends around the longitudinal centerline 12.

In general, the turbofan 10 includes a fan section 14 and a core turbine engine 16 disposed downstream of the fan section 14. The core turbine engine 16 depicted generally includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37. Additionally, a space between the casing 18 and the compressors 22, 24, a combustor of the combustion section 26, and the turbines 28, 30 may be referred to as an "under-cowl" area.

The fan section 14 includes a fan 38 having a plurality of fan blades 40 coupled to a disk 42 in a spaced apart manner. As depicted, the fan blades 40 extend outwardly from disk 42 generally along the radial direction R. The fan blades 40 and disk 42 are together rotatable about the longitudinal axis 12 by the LP shaft 36. For this embodiment, the fan blades 40 and disk 42 are together rotatable about the longitudinal axis 12 by the LP shaft 36 across a reduction gearbox/power gearbox 46. The reduction gearbox 46 includes a plurality of gears for adjusting or reducing the rotational speed of the fan 38 relative to the LP shaft 36 to a more efficient rotational fan speed. In some embodiments, however, turbofan 10 does not include a reduction gearbox 46.

Referring still to the exemplary embodiment of FIG. 1, the disk 42 is covered by a rotatable spinner or front hub 48 aerodynamically contoured to promote an airflow through the plurality of fan blades 40. Additionally, the exemplary fan section 14 includes an annular fan casing or outer nacelle 50 that circumferentially surrounds the fan 38 and a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define an annular bypass airflow passage 56 therebetween. In some embodiments, the nacelle 50 may extend substantially along or along the full axial length of the core turbine engine 16 such that turbofan 10 is a long-duct, mix-flow turbofan. In yet other embodiments, nacelle 50 may extend annularly around the core turbine engine 116 such that turbofan 10 is a low-bypass, mixed flow engine with a fixed or variable exhaust nozzle at nozzle section 32.

During operation of the turbofan 10, a volume of air 58 enters the turbofan 10 through an associated inlet 60 of the nacelle 50 and/or fan section 14 and passes across the fan blades 40. The volume of air 58 is then split at a flow splitter 51 into a first portion of air 62 that is directed or routed into the bypass airflow passage 56 and a second portion of air 64 is directed or routed into the annular core inlet 20 of the core air flowpath 37. The ratio between the first portion of air 62 and the second portion of air 64 is commonly known as a bypass ratio. The pressure of the second portion of air 64 is first increased by the booster or LP compressor 22 and is further increased as it is routed through the HP compressor 24. The compressed first portion of air 64 flows into the combustion section 26 where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In addition, as further shown in FIG. 1, the turbofan 10 includes a controller 90 operatively configured to control various aspects of the turbofan 10, such as e.g., controlling and monitoring various characteristics of the fluid flowing through one or more flow ducts of the turbofan 10, e.g., the bypass airflow passage 56 or the core air flowpath 37. The controller 90 can be, for example, an Electronic Engine Controller (EEC) or a Digital Engine Controller (DEC) equipped with Full Authority Digital Engine Control (FADEC). The controller 90 can include one or more processor(s) and one or more memory device(s). The one or more processor(s) can include any suitable processing device, such as a microprocessor, microcontroller, integrated circuit, logic device, and/or other suitable processing device. The one or more memory device(s) can include one or more computer-readable media, including, but not limited to, non-transitory computer-readable media, RAM, ROM, hard drives, flash drives, and/or other memory devices.

The one or more memory device(s) can store information accessible by the one or more processor(s), including computer-readable instructions that can be executed by the one or more processor(s). The instructions can be any set of instructions that when executed by the one or more processor(s), cause the one or more processor(s) to perform operations. In some embodiments, the instructions can be executed by the one or more processor(s) to cause the one or more processor(s) to perform operations, such as any of the operations and functions for which controller 90 is configured. The instructions can be software written in any suitable programming language or can be implemented in hardware. Additionally, and/or alternatively, the instructions can be executed in logically and/or virtually separate threads on processor(s). The memory device(s) can further store data that can be accessed by the one or more processor(s). For example, the data can include various thresholds that facilitate transitioning between gain states for actuating components, as will be described in greater detail herein. The data can be stored in one of the memory device(s) of controller 90, which can be downloaded or transmitted to other computing systems, such as e.g., an offboard computing system.

The controller 90 can also include a communication interface for communicating with the other components (e.g., actuating components or actuators configured to actuate such components) via a communication bus. The communication interface can include any suitable components for interfacing with one or more network(s), including e.g., transmitters, receivers, ports, controllers, antennas, and/or other suitable components.

The controller 90 may be communicatively coupled with a communication network. Communication network can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the controller 90 to other computing systems. Such networking environments may use a wide variety of communication protocols and standards, such as e.g., Ethernet, CAT, ARINC standards.

The exemplary turbofan 10 depicted in FIG. 1 is provided as an example only. In other exemplary embodiments, the turbofan 10 may have any other suitable configuration. For example, in other exemplary embodiments, aspects of the present disclosure may be incorporated into, e.g., a turboshaft engine, turboprop engine, turbocore engine, turbojet engine, an aeroderivative engine, industrial turbine engines, etc. Moreover, aspects of the present disclosure may be incorporated into other types of engines, such as steam turbine engines. In addition, in other exemplary embodiments, aspects of the present disclosure may be incorporated into other systems or applications having a flow duct. For instance, aspects of the present disclosure may be incorporated into flow ducts of the chemical process plants, petroleum refineries, cover pipelines (e.g., steam-pipes), power plants, industrial burners (e.g., coal-fired power plants), industrial coolers (e.g., large-scale HVAC or refrigeration systems), industrial heat exchangers, etc.

Figure 2:
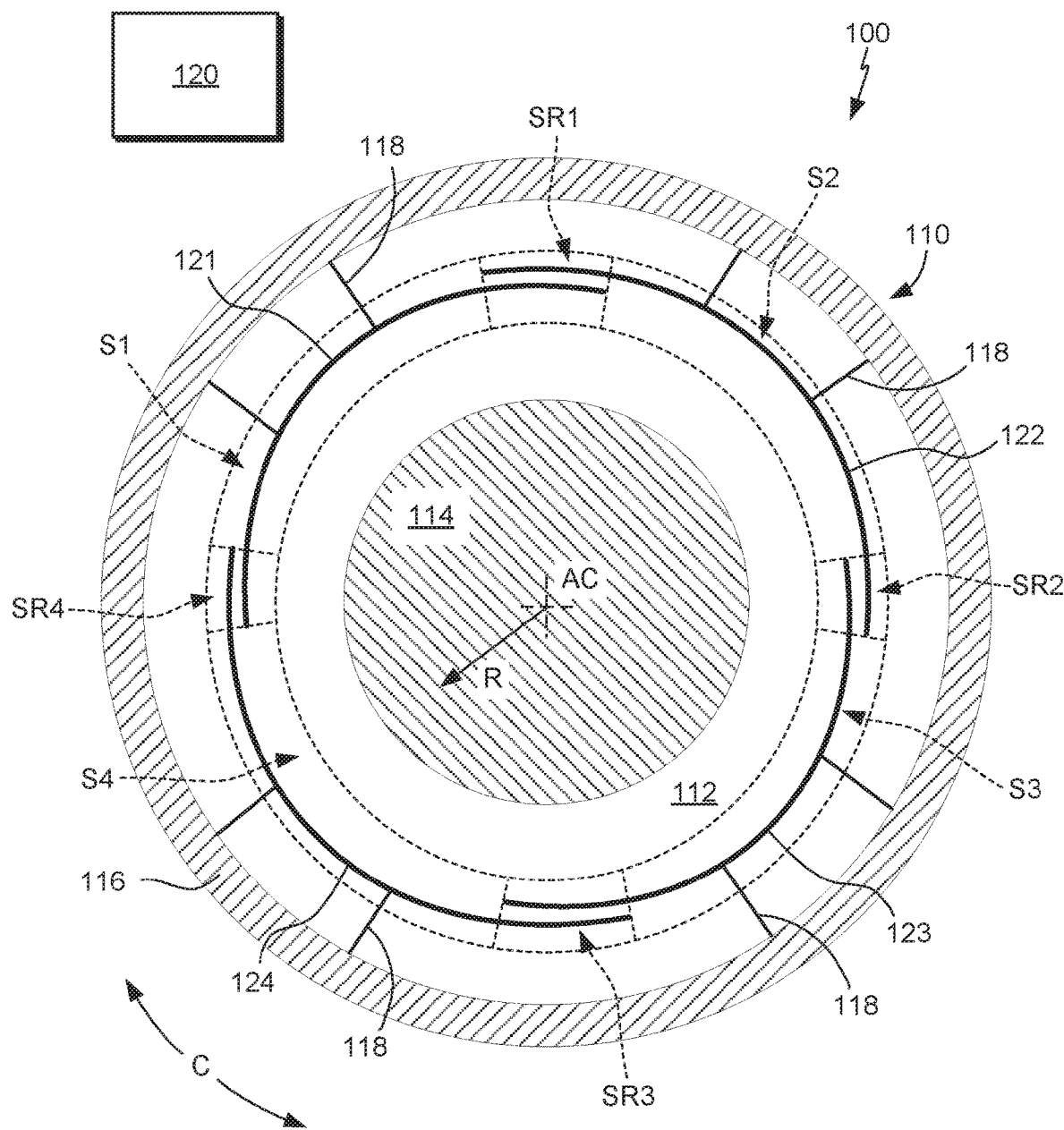
FIG. 2 provides a schematic, axial cross sectional view of an exemplary monitoring and control system for a flow duct in accordance with aspects of the present disclosure.

FIG. 2 provides a schematic, axial cross sectional view of an exemplary monitoring and control system 100 for a flow duct 110 in accordance with exemplary aspects of the present disclosure. Generally, the monitoring and control system 100 is operatively configured for sensing and monitoring characteristics of the fluid flowing through a flow passage 112 defined by the flow duct 110. As one example, the flow duct 110 may be the annular flow duct formed by the casing 18 and nacelle 50 of the turbofan 10 of FIG. 1 and the flow passage may be the bypass airflow passage 56. Example characteristics of the fluid that may be sensed and monitored by the system 100 include the pressure and temperature of the fluid flowing within the flow duct 110. Moreover, other characteristics may be sensed and monitored, such as e.g., mass flow. Further, the system 100 is operatively configured to control various operational components based at least in part on the sensed and monitored characteristics of the fluid flowing through the flow passage 112 of the flow duct 110.

As shown in FIG. 2, the flow duct 110 defines an axial direction A, a radial direction R, and a circumferential direction C. The flow duct 110 also defines an axial centerline AC extending through its center along the axial direction A. Generally, the axial direction A extends parallel to the axial centerline AC, the radial direction R extends orthogonally to and from the axial centerline AC, and the circumferential direction C extends around the axial centerline AC.

For this embodiment, the flow duct 110 is an annular flow duct. Particularly, the flow duct 110 includes an inner wall 114 and an outer wall 116 spaced from the inner wall 114, e.g., along the radial direction R. For instance, the inner wall 114 may be the casing 18 and the outer wall 116 may be the nacelle 50 of the turbofan 10 of FIG. 1. In other embodiments, the inner wall 114 may be an inner duct wall and the outer wall 116 may be an outer duct wall of the core air flowpath 37 of the turbofan 10 of FIG. 1. Although the flow duct is depicted in FIG. 2 as having a generally annular shape, in other exemplary embodiments, the flow duct 110 may be a tube, pipe, generally circular, elliptical, oval-shaped, or some other cross section having some degree of curvature.

The system 100 depicted in FIG. 2 includes a controller 120 and a plurality of sensors arranged in an overlapping or overlapped arrangement. The controller 120 may be the controller 90 of the turbofan 10 of FIG. 1, for example. The controller 120 is communicatively coupled with the plurality of sensors, e.g., by any suitable wired or wireless connection. For this embodiment, the system 100 includes a first sensor 121 extending along the circumferential direction C within the flow passage 112, a second sensor 122 extending along the circumferential direction C within the flow passage 112, a third sensor 123 extending along the circumferential direction C within the flow passage 112, and a fourth sensor 124 extending along the circumferential direction C within the flow passage 112. Each sensor 121, 122, 123, 124 is coupled with the outer wall 116 by one or more coupling members 118. The coupling members 118 structurally support and hold the sensors 121, 122, 123, 124 in place. Additionally or alternatively, the sensors 121, 122, 123, 124 may be coupled with the inner wall 114. Further, for this embodiment, the sensors 121, 122, 123, 124 are disposed within the flow passage approximately midway between the inner wall 114 and the outer wall 116, e.g., along the radial direction R. In this way, the readings by the sensors 121, 122, 123, 124 are not or minimally affected by boundary layers along the surfaces of the inner and outer walls 114, 116. In some embodiments, the sensors 121, 122, 123, 124 are disposed at or about midway between the outer surface of the inner wall 114 and the inner surface of the outer wall 116, e.g., along the radial direction R. Further in some embodiments, one or more of the sensors 121, 122, 123, 124 may be affixed to inner wall 114 and/or one or more of the sensors 121, 122, 123, 124 may be affixed to outer wall 116.

Moreover, for this embodiment, the first, second, third, and fourth sensors 121, 122, 123, 124 are each averaging sensors. That is, each sensor is configured to sense or take an average of a characteristic of the fluid proximate their respective locations. For instance, the first sensor 121 is configured to sense or take an average of a characteristic of the fluid proximate the first sensor 121, the second sensor 122 is configured to sense or take an average of a characteristic of the fluid proximate the second sensor 122, and so on. The first, second, third, and fourth sensors 121, 122, 123, 124 may be any suitable type of averaging sensor. As one example, in some embodiments, the sensors 121, 122, 123, 124 are resistance temperature detectors (RTD) ribbon sensors configured for sensing or taking the average temperature of the fluid flowing through the flow passage 112 at their respective locations. As another example, the sensors 121, 122, 123, 124 may be averaging pressure sensors.

As noted above, the sensors 121, 122, 123, and 124 of the system 100 have an overlapped arrangement. More particularly, for this embodiment, the first sensor 121 extends along the circumferential direction C such that at least a portion of the first sensor 121 physically overlaps the second sensor 122 along the circumferential direction C. Thus, the second sensor 122 also physically overlaps the first sensor 121 along the circumferential direction C. That is, at least a portion of the first sensor 121 and at least a portion of the second sensor 122 physically extend along the same portion or arc segment of the arc about the axial centerline AC. As further shown, the second sensor 122 extends along the circumferential direction C such that at least a portion of the second sensor 122 physically overlaps the third sensor 123 along the circumferential direction C. Consequently, the third sensor 123 also physically overlaps the second sensor 122 along the circumferential direction C. The third sensor 123 extends along the circumferential direction C such that at least a portion of the third sensor 123 physically overlaps the fourth sensor 124 along the circumferential direction C. Accordingly, the fourth sensor 124 also physically overlaps the third sensor 123 along the circumferential direction C. In addition, the fourth sensor 124 extends along the circumferential direction C such that at least a portion of the fourth sensor 124 physically overlaps the first sensor 121 along the circumferential direction C. Accordingly, the first sensor 121 also physically overlaps the fourth sensor 124 along the circumferential direction C.

As further shown in FIG. 2, the first and second sensors 121, 122 define a first overlap sensing region SR1 along the circumferential direction C where the first sensor 121 and the second sensor 122 physically overlap one another along the circumferential direction C. The second and third sensors 122, 123 define a second overlap sensing region SR2 along the circumferential direction C where the second sensor 122 and the third sensor 123 physically overlap one another along the circumferential direction C. The third and fourth sensors 123, 124 define a third overlap sensing region SR3 along the circumferential direction C where the third sensor 123 and the fourth sensor 124 physically overlap one another along the circumferential direction C. The fourth and first sensors 124, 121 define a fourth overlap sensing region SR4 along the circumferential direction C where the fourth sensor 124 and the first sensor 121 physically overlap one another along the circumferential direction C.

In addition, the first sensor 121 defines a first sensing region S1 along the circumferential direction C where the first sensor 121 does not overlap with either the second sensor 122 or the fourth sensor 124 along the circumferential direction C. The second sensor 122 defines a second sensing region S2 along the circumferential direction C where the second sensor 122 does not overlap with either the first sensor 121 or the third sensor 123 along the circumferential direction C. The third sensor 123 defines a third sensing region S3 along the circumferential direction C where the third sensor 123 does not overlap with either the second sensor 122 or the fourth sensor 124 along the circumferential direction C. The fourth sensor 124 defines a fourth sensing region S4 along the circumferential direction C where the fourth sensor 124 does not overlap with either the third sensor 123 or the first sensor 121 along the circumferential direction C. Accordingly, for this embodiment, there are four (4) sensing regions S1, S2, S3, and S4 and four (4) overlap sensing regions SR1, SR2, SR3, and SR4 interspersed with the sensing regions in an alternating arrangement. Advantageously, for this embodiment, a total of eight (8) sensing zones or regions are created with only four (4) sensors, i.e., the first, second, third, and fourth sensors 121, 122, 123, 124. Thus, the fluid characteristic or characteristics of the fluid flowing through the flow passage 112 of the flow duct 110 may be sensed with a higher level of fidelity or exactness at particular locations within the flow passage 112 than could otherwise be achieved without the overlapped arrangement of the sensors. In this manner, as will be explained more fully below, the system 100 can better monitor the component state of one or more operational components disposed within or proximate the flow passage 112.

Figure 3:
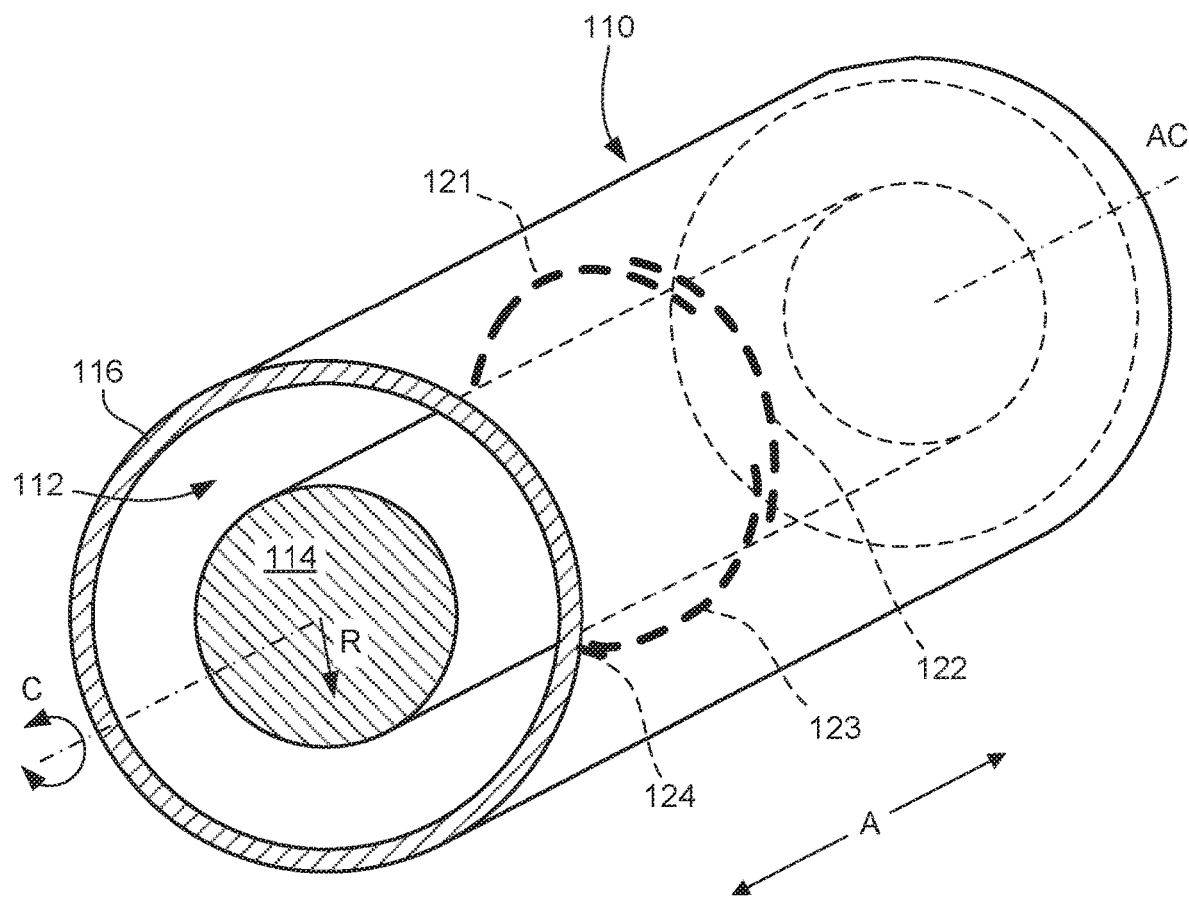
FIG. 3 provides a perspective view of the exemplary flow duct of FIG. 2 depicting sensors of the system disposed within a flow passage defined by the flow duct in an overlapped arrangement.

FIG. 3 provides a perspective view of the exemplary flow duct 110 of FIG. 2 depicting the sensors of the system 100 disposed within the flow passage 112 in an overlapped arrangement. As shown in FIG. 3, the first sensor 121, the second sensor 122, the third sensor 123, and the fourth sensor 124 each extend along the circumferential direction C within the flow passage 112 in the same or substantially the same plane along the axial direction A. In some embodiments, "substantially the same plane" means that the noted sensors are within one foot of each other along the axial direction A. In particular, for this embodiment, the sensors 121, 122, 123, 124 are disposed in an overlapped arrangement and extend along the circumferential direction C within the flow passage 112 in a plane that is orthogonal to the axial direction A. In this way, when the sensors 121, 122, 123, 124 sense a particular characteristic of the fluid flowing through the flow passage 112 of the flow duct 110, the sensors sense characteristics of the fluid flow at that particular plane. This may provide a better of the flow's uniformity through the flow passage 112.

As shown in FIGS. 2 and 3, the sensors 121, 122, 123, 124 may collectively extend about the annular flow passage 112. In this way, the sensors 121, 122, 123, 124 collectively form an annular sensing ring. Although only one annular sensing ring is shown in FIGS. 2 and 3, it will be appreciated that the system 100 may include multiple annular sensing rings spaced from one another, e.g., along the axial direction A. In this way, characteristics of the fluid flow through the flow passage 112 may be sensed at a first axial plane (a first plane orthogonal to the axial direction A) and again at a second axial plane (a second plane orthogonal to the axial direction A). However, as explained more fully below, the sensors of the system need not collectively extend entirely around the annulus of the flow passage 112.

Figure 4:
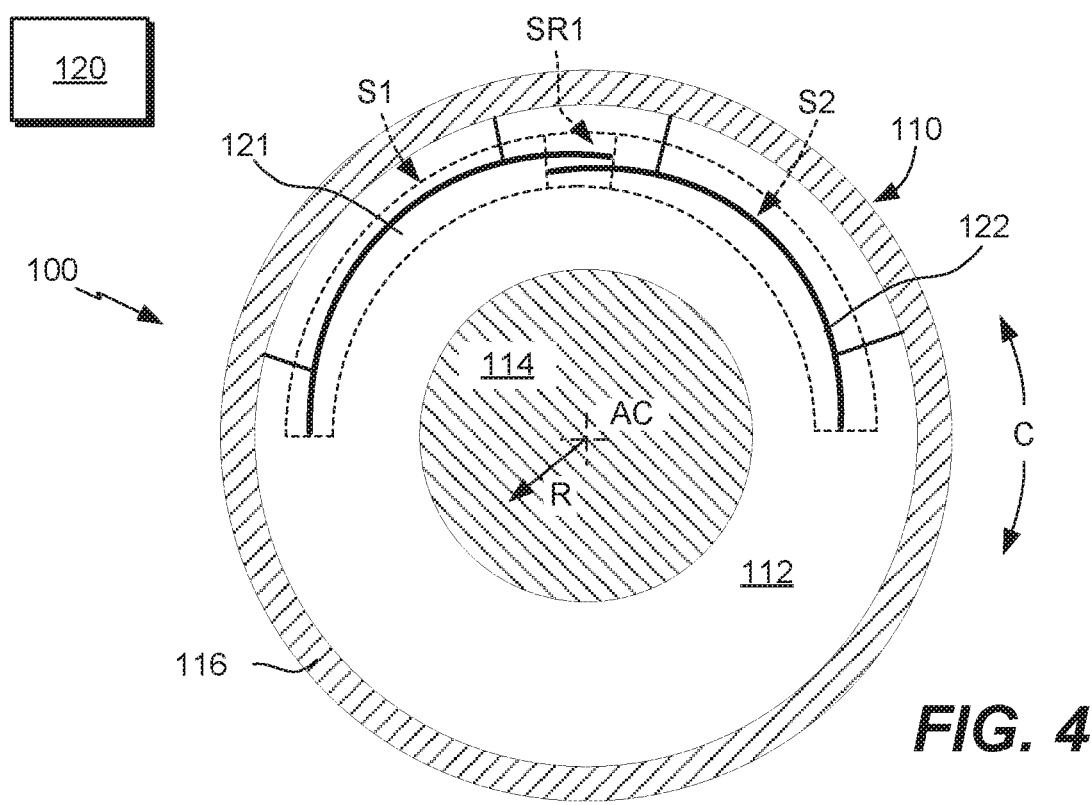
FIG. 4 provides a schematic, axial cross sectional view of another exemplary monitoring and control system in accordance with exemplary aspects of the present disclosure.

FIG. 4 provides a schematic, axial cross sectional view of another exemplary monitoring and control system 100 in accordance with exemplary aspects of the present disclosure. As shown in FIG. 4, the system 100 includes a first sensor 121 disposed within the flow passage 112 and extending along the circumferential direction C and a second sensor 122 disposed within the flow passage 112 and extending along the circumferential direction C. In contrast with the system 100 of FIG. 2, for this embodiment, the system 100 includes only a first and second sensor 121, 122 and the sensors 121, 122 collectively do not extend around the entire annulus of the flow passage 112. Rather, the sensors 121, 122 form a partial annular sensing ring or a ring segment. Notably, the first sensor 121 and the second sensor 122 are in an overlapped arrangement. That is, at least a portion of the first sensor 121 and at least a portion of the second sensor 122 physically extend along the circumferential direction C along the same portion or arc segment of the arc about the axial centerline AC. Accordingly, as shown, the first and second sensors 121, 122 define a first overlap sensing region SR1 extending along the circumferential direction C where the first sensor 121 and the second sensor 122 physically overlap one another. In addition, the first sensor 121 defines a first sensing region S1 along the circumferential direction C where the first sensor 121 does not overlap with the second sensor 122 and the second sensor 122 defines a second sensing region S2 along the circumferential direction C where the second sensor 122 does not overlap with the first sensor 121.

In some embodiments, however, the first and second sensors 121, 122 may collectively form an annular sensing ring. In such embodiments, the first and second sensors 121, 122 define a first overlap sensing region along the circumferential direction C where the first sensor 121 and the second sensor 122 physically overlap one another at a first location along the circumferential direction C and a second overlap sensing region along the circumferential direction C where the first sensor 121 and the second sensor 122 physically overlap one another at a second location along the circumferential direction C. The first sensor 121 defines a first sensing region along the circumferential direction C where the first sensor 121 does not overlap with the second sensor 122 and the second sensor 122 defines a second sensing region along the circumferential direction C where the second sensor 122 does not overlap with the first sensor 121.

Figure 5:
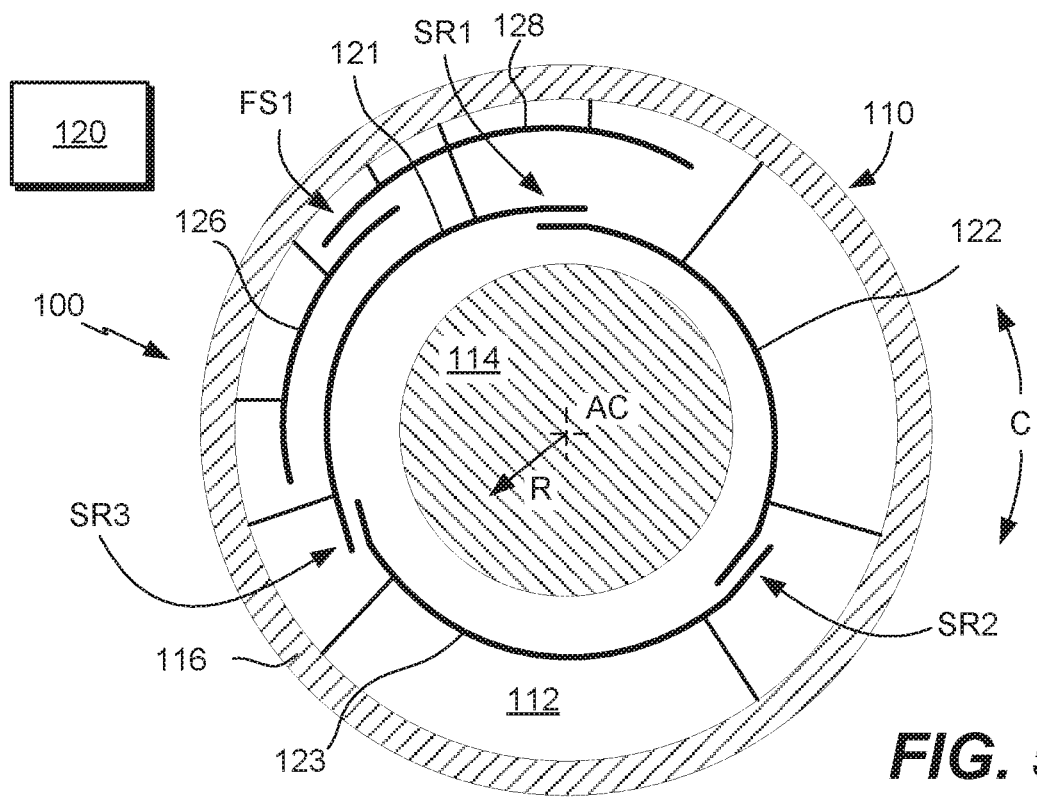
FIG. 5 provides a schematic, axial cross sectional view of yet another exemplary monitoring and control system in accordance with exemplary aspects of the present disclosure.

FIG. 5 provides a schematic, axial cross sectional view of another exemplary monitoring and control system 100 in accordance with exemplary aspects of the present disclosure. As shown in FIG. 5, the system 100 includes an annular sensing ring collectively formed by a first sensor 121 disposed within the flow passage 112 and extending along the circumferential direction C, a second sensor 122 disposed within the flow passage 112 and extending along the circumferential direction C, and a third sensor 123 disposed within the flow passage 112 and extending along the circumferential direction C. As further shown in FIG. 5, the system 100 includes a first outer sensor 126 disposed within the flow passage 112 and extending along the circumferential direction C and a second outer sensor 128 disposed within the flow passage 112 and extending along the circumferential direction C. Notably, the first and second outer sensors 126, 128 are disposed in an overlapped arrangement and are disposed outward of the sensors 121, 122, 123, 124, e.g., along the radial direction R. Moreover, the first and second outer sensors 126, 128 form a partial annular sensing ring or a ring segment. Further, the first and second outer sensors 126, 128 are disposed within the same axial plane as the sensors 121, 122, 123, 124 (i.e., a plane orthogonal to the axial direction A). For this embodiment, one or more characteristics of the fluid flowing through the flow passage 112 of the flow duct 110 may be sensed at a radially inward position, e.g., by the sensors 121, 122, 123, 124, and at a radially outward position, e.g., by the first and second outer sensors 126, 128. In this way, a greater level of fidelity of the characteristics of the fluid at this particular axial plane of the flow duct 110 may be achieved.

Moreover, as shown in FIG. 5, for this embodiment, the first and second outer sensors 126, 128 define a first outer overlap sensing region FS1 extending along the circumferential direction C where the first outer sensor 126 and the second outer sensor 128 physically overlap one another along the circumferential direction C. Notably, the first outer overlap sensing region FS1 is offset from the first overlap sensing region SR1 and the third overlap sensing region SR3, e.g., along the circumferential direction C. In some embodiments, however, the first outer overlap sensing region FS1 and one of the other overlap sensing regions may be aligned along the circumferential direction C.

Figure 6:
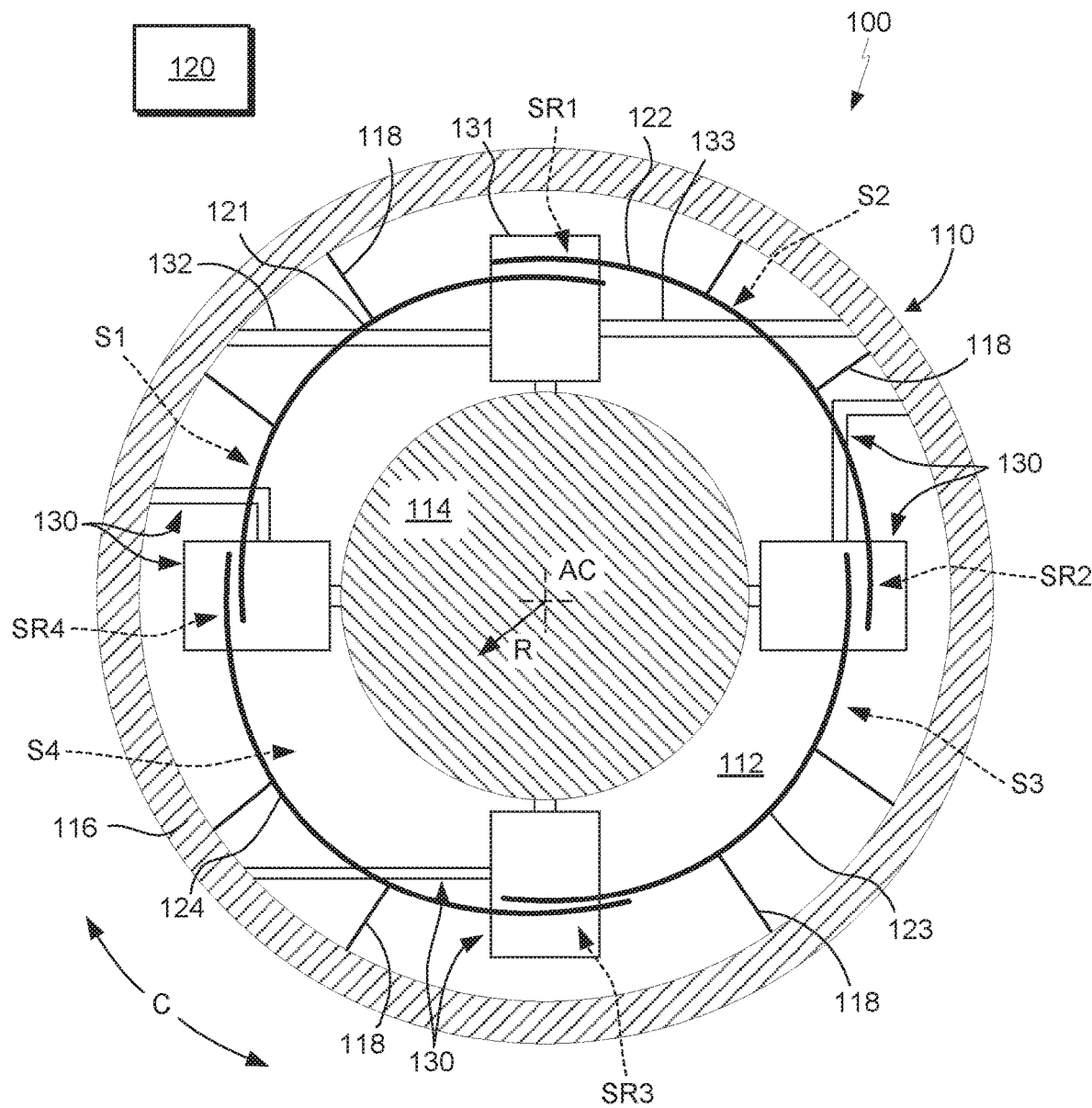
FIG. 6 provides a schematic, axial cross sectional view of a further exemplary monitoring and control system in accordance with exemplary aspects of the present disclosure.

FIG. 6 provides a schematic, axial cross sectional view of another exemplary monitoring and control system 100 for a flow duct in accordance with aspects of the present disclosure. As shown in FIG. 6, for this embodiment, one or more operational components are disposed at least partially within or along the flow passage 112. In particular, a first operational component 131, a second operational component 132, and a third operational component 133 is positioned within or along the flow passage 112 of the flow duct 110. For this embodiment, the first operational component 131 is disposed at least partially within the first overlap sensing region SR1 along the circumferential direction C. Further, the first operational component 131 is disposed at least partially within or proximate the first overlap sensing region SR1 along the axial direction A and the radial direction R. The second operational component 132 is disposed at least partially within the first sensing region S1 along the circumferential direction C and is disposed at least partially within or proximate the first sensing region S1 along the axial direction A and the radial direction R. The third operational component 133 is disposed at least partially within the second sensing region S2 along the circumferential direction C and is disposed at least partially within or proximate the second sensing region S2 along the axial direction A and the radial direction R as shown.

The first operational component 131, the second operational component 132, and the third operational component 133 may be any suitable operational components. For the depicted embodiment of FIG. 6, for example, the first operational component 131 is a heat exchanger, the second operational component 132 is a supply line in fluid communication with the heat exchanger, and the third operational component 133 is a return line in fluid communication with the heat exchanger. As noted above, the first operational component 131, or heat exchanger, is disposed at least partially within the first overlap sensing region SR1 along the circumferential direction C and at least partially within or proximate the first overlap sensing region SR1 along the axial and radial directions A, R. Moreover, the second operational component 132 and the third operational component 133, or supply and return lines, respectively, are disposed at least partially within the first and second sensing regions S1, S2, respectively, along the circumferential direction C and are disposed at least partially within or proximate their respective sensing regions S1, S2 along the axial and radial directions A, R. It will be appreciated that the inverse of the arrangement of the operational components is also possible. For instance, the first operational component 131 or heat exchanger in this embodiment may be disposed within one of the sensing regions and the second and third operational components may be disposed at least partially within one of the overlap sensing regions.

By strategically arranging the sensing regions or sensing overlap regions defined by the sensors of the system 100, the system 100 may better evaluate the performance of certain operational components, such as e.g., the operational components 131, 132, 133 of FIG. 6. That is, the overlapped arrangement of the sensors provide more granularity than could otherwise be achieved with conventional arrangements. Specifically, the overlapped arrangement of the sensors enables the monitoring and control system 100 to isolate various impacts of heat exchanger performance, or more broadly the performance of any operational component, with a higher level of granularity than would otherwise be available with other sensor arrangements. Adding granularity to the system's measurement capabilities without adding weight or interfaces to the system allows for better performance modeling and prognostics and health management (PHM) of systems for which the monitoring and control system 100 is designed, such as e.g., a turbine engine. Additional interfaces, such as I/O interfaces, may impact the size and cost of the controller 120. An exemplary manner in which the system 100 may be operated and controlled is provided below.

Figure 7:
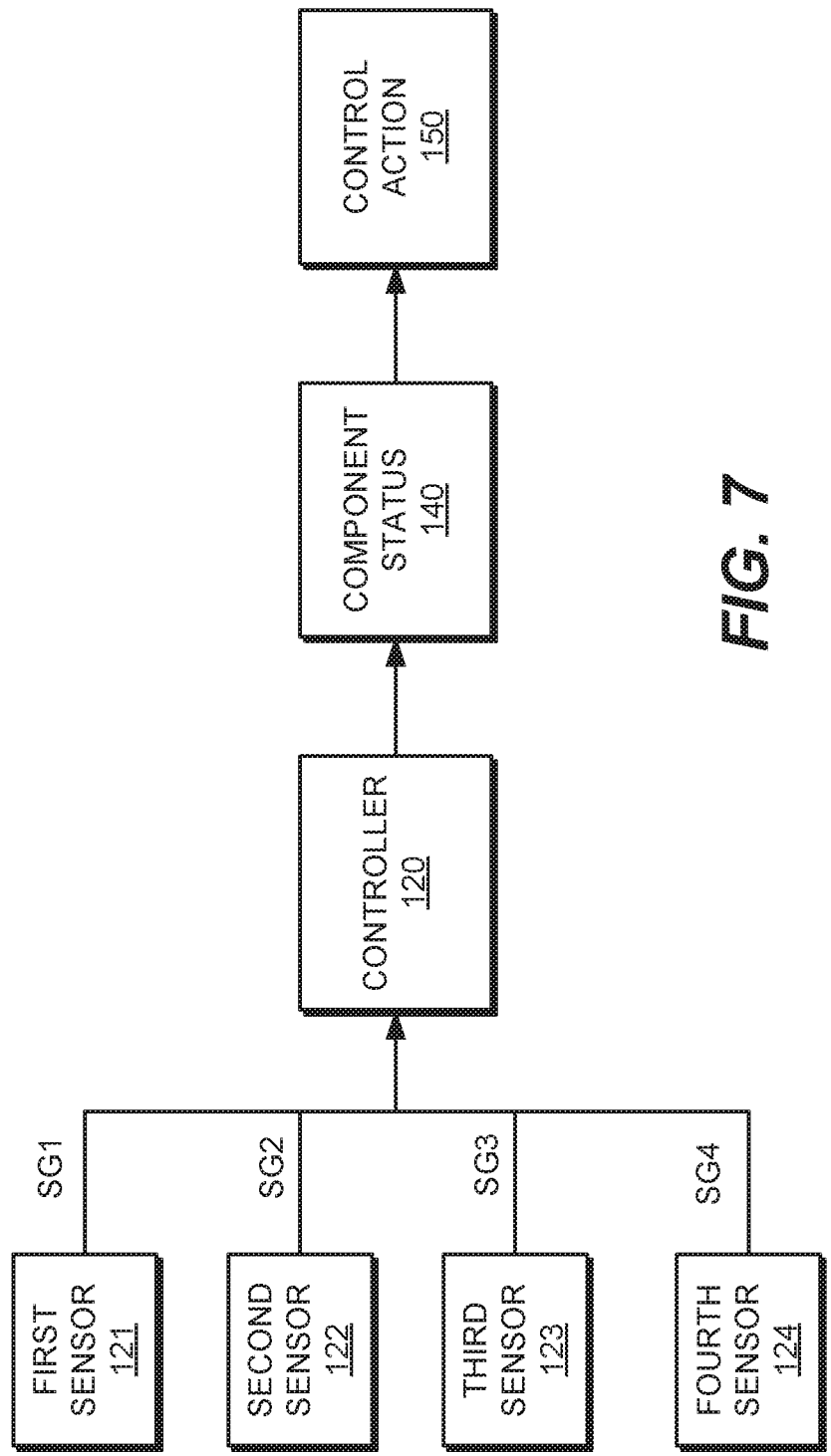
FIG. 7 provides a block diagram of an exemplary process flow of an exemplary monitoring and control system in accordance with exemplary aspects of the present disclosure.

FIG. 7 provides a block diagram of an exemplary process flow of an exemplary monitoring and control system in accordance with exemplary aspects of the present disclosure. For instance, the system may be the system 100 of FIG. 6. As shown in FIGS. 6 and 7, the controller 120 is communicatively coupled with the averaging sensors, including the first averaging sensor 121, the second averaging sensor 122, the third averaging sensor 123, and the fourth averaging sensor 124.

As shown particularly in FIG. 7, in some embodiments, for a particular time step of the controller 120 or at certain predetermined intervals, the controller 120 receives one or more signals from the sensors 121, 122, 123, 124. For instance, for this embodiment, the controller 120 is configured to receive a first signal SG1 from the first averaging sensor 121 indicative of a characteristic of the fluid flowing proximate the first averaging sensor 121. The controller 120 is also configured to receive a second signal SG2 from the second averaging sensor 122 indicative of a characteristic of the fluid flowing proximate the second averaging sensor 122. The controller 120 is also configured to receive a third signal SG3 from the third averaging sensor 123 indicative of a characteristic of the fluid flowing proximate the third averaging sensor 123. Moreover, the controller 120 is configured to receive a fourth signal SG4 from the fourth averaging sensor 124 indicative of a characteristic of the fluid flowing proximate the fourth averaging sensor 124. In other alternative embodiments, if the system 100 includes more than four (4) sensors, the controller 120 may receive signals from the other sensors as well. The controller 120 may receive the signals directly from the sensors or indirectly, e.g., through one or more electronic components and/or processing filters.

Once the controller 120 receives the signals from the various sensors 121, 122, 123, 124 of the system 100, the controller 120 determines a component status 140 of one or more operational components of the system 100. For instance, the controller 120 may determine the component status of the first operational component 131, the second operational component 132, the third operational component 133, as well as other operational components 130 disposed within the flow passage 112 or fluidly connected therewith as shown in FIG. 6. The component status of each of the components is determined based at least in part on the signals received from the sensors 121, 122, 123, 124. The component status can be, for example, whether the operational component is "operating in range" or "operating out-of-range." Other statuses of the operational components are possible. Based on the determined component status, the controller may generate a control action 150 as shown in FIG. 7 and as will be explained further below.

With reference to the depicted embodiment of FIG. 6, as shown the sensing regions defined by the sensors 121, 122, 123, 124 are strategically positioned to be positioned proximate certain operational components of interest. For instance, the first operational component 131 is disposed at least partially within the first overlap sensing region SR1, the second operational component 132 is disposed within the first sensing region S1, the third operational component 133 is disposed within the second sensing region S2, and the other sensing regions are positioned proximate other operational components 130 of interest.

One manner in which the component status of the first operational component 131 may be determined is provided as follows. Notably, the first operational component 131 is disposed at least partially within the first overlap sensing region SR1. Accordingly, the component status of the first operational component 131 is determined based at least in part on the first signal SG1 and the second signal SG2. More particularly, the controller 120 ascertains whether the first averaging sensor 121 is registering or has registered the characteristic of the fluid within a first predetermined operating range based at least in part on the first signal SG1. The controller 120 also ascertains whether the second averaging sensor 122 is registering the characteristic of the fluid within a second predetermined operating range based at least in part on the second signal SG2.

In one scenario, if both the first and second sensors 121, 122 have registered the characteristic of the fluid proximate their respective locations within their respective predetermined operating ranges, then the controller 120 determines that the first operational component 131 is operating in range. A control action may be generated based on such status. For instance, the controller 120 may generate a communication representative of the status and the sensed data and may forward it to a suitable computing system or model for further analysis, such as e.g., a lifing model, a maintenance model, a PHM model, some combination thereof, etc. A control action may also include instructions for operating the system driving or forcing the fluid through the flow passage 112 to adjust its parameters in order to drive the characteristic to an optimal operating point. Other example control actions may be generated by the controller 120.

In another scenario, if one but not both of the first and second sensors 121, 122 have registered the characteristic of the fluid proximate their respective locations within their respective predetermined operating ranges, then the controller 120 determines that the first operational component 131 is operating in range but that some other operational component, such as the second operational component 132 disposed within the first sensing region S1 or the third operational component 133 disposed within the second sensing region S2, is not in operating range depending on which sensor is registering a characteristic that is not in operating range. A control action may be generated based on such status.

In yet another scenario, if both the first and second sensors 121, 122 have registered the characteristic of the fluid proximate their respective locations not within their respective predetermined operating ranges, then the controller 120 determines that the first operational component 131 is not operating in range. A control action may be generated based on such status. For instance, the controller 120 may generate a communication representative of the status and the sensed data and may forward it to a suitable computing system or model for further analysis, such as e.g., a lifing model, a maintenance model, a PHM model, some combination thereof, etc. The control action may also include flagging the component. For instance, the first operational component may be flagged as a failure and a communication may be forwarded to a maintenance crew, or in some instance, the component can be automatically shut or turned off. Additionally or alternatively, the control action may include instructions for operating the system driving or forcing the fluid through the flow passage 112 to adjust its parameters in order to drive the characteristic to an optimal operating point. Other example control actions may be generated by the controller 120.

One manner in which the component status of the second operational component 132 may be determined is provided as follows. Notably, the second operational component 132 is disposed within the first sensing region S1. Accordingly, the component status of the second operational component 132 is determined based at least in part on the first signal SG1, the second signal SG2, and the fourth signal SG4. More particularly, the controller 120 ascertains whether the first averaging sensor 121 is registering or has registered the characteristic of the fluid within a first predetermined operating range based at least in part on the first signal SG1. The controller 120 also ascertains whether the second averaging sensor 122 is registering the characteristic of the fluid within a second predetermined operating range based at least in part on the second signal SG2. The controller 120 further ascertains whether the fourth averaging sensor 124 is registering or has registered the characteristic of the fluid within a fourth predetermined operating range based at least in part on the fourth signal SG4.

In one scenario, if the first sensor 121 has registered the characteristic of the fluid proximate the first sensor 121 within the first predetermined operating range, then the controller 120 determines that the second operational component 132 is operating in range. A control action may be generated based on such status. In another scenario, if both the first and second sensors 121, 122 have registered the characteristic of the fluid proximate their respective locations not within their respective predetermined operating ranges, then the controller 120 determines that the first operational component 131 is not operating in range and that the second operational component 132 is likely operating in range. A control action may be generated based on such status. Similarly, in yet another scenario, if both the first and fourth sensors 121, 124 have registered the characteristic of the fluid proximate their respective locations not within their respective predetermined operating ranges, then the controller 120 determines that the operational component 130 disposed within the forth overlap sensing region SR4 is not operating in range and that the second operational component 132 is likely operating in range. A control action may be generated based on such status.

One manner in which the component status of the third operational component 133 may be determined is provided as follows. Notably, the third operational component 133 is disposed within the second sensing region S2. Accordingly, the component status of the third operational component 133 is determined based at least in part on the first signal SG1, the second signal SG2, and the third signal SG3. More particularly, the controller 120 ascertains whether the first averaging sensor 121 is registering or has registered the characteristic of the fluid within a first predetermined operating range based at least in part on the first signal SG1. The controller 120 also ascertains whether the second averaging sensor 122 is registering the characteristic of the fluid within a second predetermined operating range based at least in part on the second signal SG2. The controller 120 further ascertains whether the third averaging sensor 123 is registering or has registered the characteristic of the fluid within a third predetermined operating range based at least in part on the third signal SG3.

In one scenario, if the second sensor 122 has registered the characteristic of the fluid proximate the second sensor 122 within the second predetermined operating range, then the controller 120 determines that the third operational component 133 is operating in range. A control action may be generated based on such status. In another scenario, if both the first and second sensors 121, 122 have registered the characteristic of the fluid proximate their respective locations not within their respective predetermined operating ranges, then the controller 120 determines that the first operational component 131 is not operating in range and that the third operational component 133 is likely operating in range. A control action may be generated based on such status. Similarly, in yet another scenario, if both the first and third sensors 121, 123 have registered the characteristic of the fluid proximate their respective locations not within their respective predetermined operating ranges, then the controller 120 determines that the operational component 130 disposed within the third overlap sensing region SR3 is not operating in range and that the third operational component 133 is likely operating in range. A control action may be generated based on such status. As shown and described, the overlapped arrangement of the sensors provides improved sensing capability compared to non-overlapped sensor arrangements.

Figure 8:
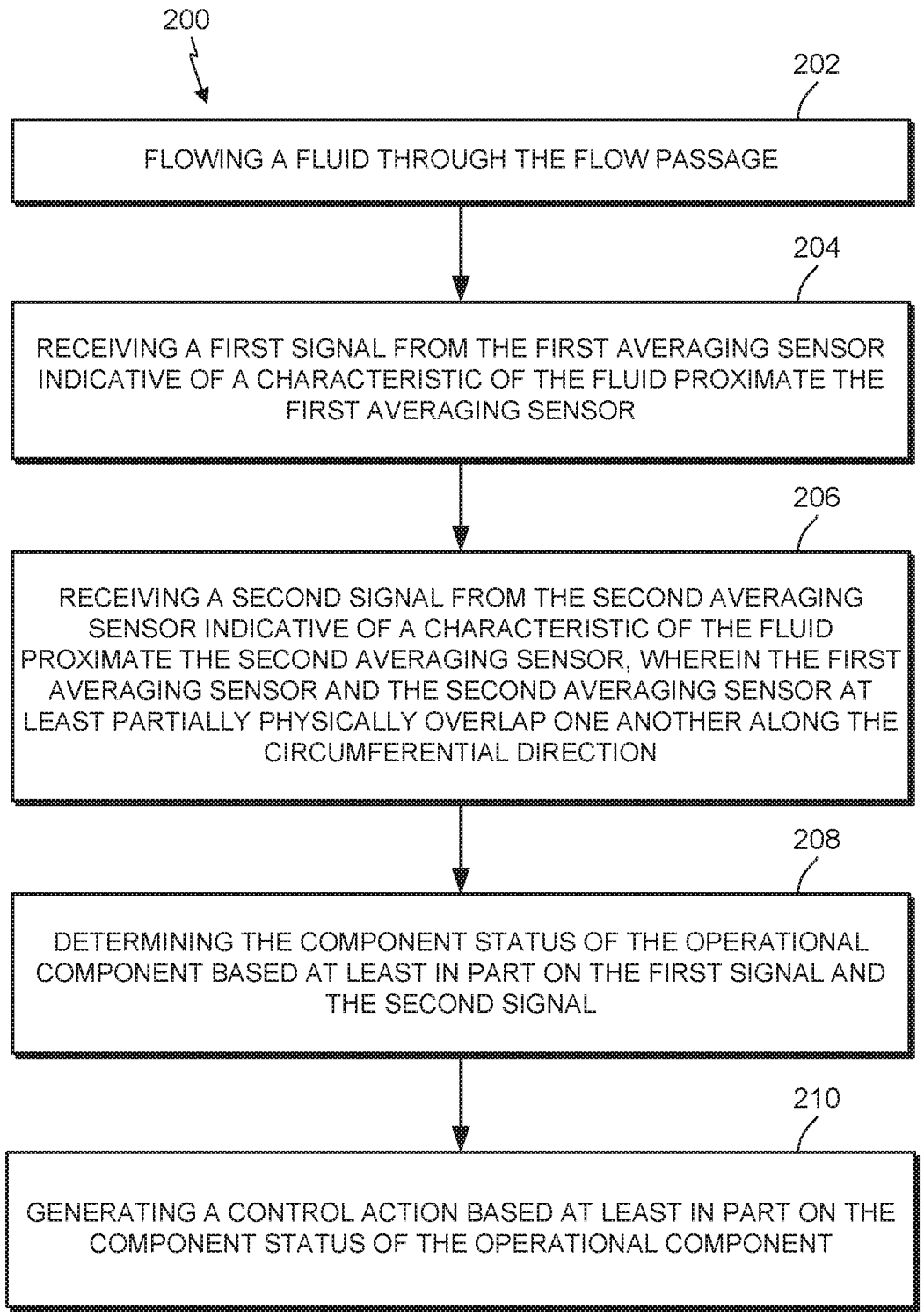
FIG. 8 provides a flow diagram of an exemplary method (200) for determining a component status of an operational component disposed within a flow passage defined by a flow duct utilizing a system according to an exemplary embodiment of the present disclosure.

FIG. 8 provides a flow diagram of an exemplary method (200) for determining a component status of an operational component disposed within a flow passage defined by a flow duct utilizing a system according to an exemplary embodiment of the present disclosure. The flow duct defines an axial direction, a radial direction, and a circumferential direction. The system includes a first averaging sensor extending along the circumferential direction within the flow passage and a second averaging sensor extending along the circumferential direction within the flow passage. The first averaging sensor and the second averaging sensor at least partially physically overlap one another along the circumferential direction. Some or all of the method (200) can be implemented by the controller of one of the exemplary monitoring and control systems disclosed herein. The method may be implemented for any suitable flow duct, e.g., a high bypass duct for a turbine engine, a core air flowpath of a turbine engine, a pipe or tube for a chemical, power, petroleum, or water treatment plant, etc. Other suitable applications are possible.

At (202), the method (200) includes flowing a fluid through the flow passage. For instance, the fluid may be a liquid or a gas. The flow passage may be defined by a flow duct having an annular, circular, or generally curved shape. As one example, the flow duct defining the flow passage may be a high bypass duct of a turbine engine, such as e.g., the turbofan 10 of FIG. 1. As noted previously, during operation of the turbofan 10, air flows through the high bypass duct, e.g., to produce thrust. The fluid may be actively forced through the fluid passage (e.g., by a pump) or may passively flow through or along the flow passage (e.g., by the gravity).

At (204), the method (200) includes receiving a first signal from the first averaging sensor indicative of a characteristic of the fluid proximate the first averaging sensor. For instance, the first averaging sensor may sense a characteristic of the fluid flowing proximate the first averaging sensor and may generate a first signal. Once generated, the first signal is routed, e.g., via a wired or wireless connection, to a controller, e.g., controller 120. The first signal is indicative of the average of the characteristic over the circumferential length of the first averaging sensor. The controller may receive signals from the first averaging sensor continuously, e.g., at each time step of the controller, or at predetermined intervals. The controller receives the first signal and may process the signal in a manner described further below.

At (206), the method (200) includes receiving a second signal from the second averaging sensor indicative of a characteristic of the fluid proximate the second averaging sensor. For instance, similar to the first averaging sensor, the second averaging sensor may sense a characteristic of the fluid flowing proximate the second averaging sensor and may generate a second signal. Once generated, the second signal is routed, e.g., via a wired or wireless connection, to the controller. The second signal is indicative of the average of the characteristic over the circumferential length of the second averaging sensor. The controller may receive signals from the second averaging sensor continuously, e.g., at each time step of the controller, or at predetermined intervals. The controller receives the second signal and may process the signal in a manner described further below.

In some implementations, the characteristic of the fluid of the first signal and the characteristic of the fluid of the second signal is a temperature of the fluid. In some implementations, the characteristic of the fluid of the first signal and the characteristic of the fluid of the second signal is a pressure of the fluid. In some implementations, the first and second signals may be indicative of both temperature and pressure. In some implementations, the characteristic of the fluid of the first and second signals may be the mass flow of the fluid flowing through the flow passage. In some further implementations, the system may include additional sensors configured for sensing a characteristic of the fluid proximate their respective sensors. In such implementations, the characteristic of the fluid sensed by such sensors may be the same as the characteristic of the first and second signals.

At (208), the method (200) includes determining the component status of the operational component based at least in part on the first signal and the second signal. For instance, once the controller receives the first and second signals (204) and (206), respectively, the controller processes the signals to determine the status of the component disposed within the flow passage. The component status can be, for example, whether the operational component is "operating properly" or "not operating properly." Other statuses of the operational component are possible. Based on the determined component status, the controller may generate a control action as noted below at (210).

At (210), the method (200) includes generating a control action based at least in part on the component status of the operational component. As one example, a control action can be generated that is representative of a communication to one or more health monitoring models of the controller or offboard computing system. As another example, a control action can be generated that is representative of a communication to PHM model. As yet another example, a control action can be generated that is representative of a communication to the components of the controller or another controller for controlling or adjusting the operational component or some other system in a way that settles the characteristic of the fluid within a predetermined operating range. For instance, one or more actuators may be adjusted to change the mass flow of the fluid through the flow passage, one or more bleed valves may be opened to adjust the pressure within the flow passage, etc.

In some implementations, determining the component status of the operational component based at least in part on the first signal and the second signal at (208) includes i) ascertaining whether the first averaging sensor is registering the characteristic of the fluid within a first predetermined operating range based at least in part on the first signal; and ii) ascertaining whether the second averaging sensor is registering the characteristic of the fluid within a second predetermined operating range based at least in part on the second signal. In such implementations, the control action is generated at (210) based at least in part on whether the first averaging sensor is registering the characteristic of the fluid within the first predetermined operating range and whether the second averaging sensor is registering the characteristic of the fluid within the second predetermined operating range.

For example, suppose the flow duct is an annular bypass duct of a turbine engine configured for producing thrust for an aerial vehicle, such as e.g., the bypass duct 56 of the gas turbine engine 10 of FIG. 1. Under normal operating conditions for a particular engine speed and altitude, suppose that the controller 120 has a lookup table that associates a temperature range expected within the bypass duct proximate the first sensor and proximate the second sensor. Upon receiving the first and second signals from the sensors, the controller determines, by using the look up table, whether the characteristic of the fluid proximate the first sensor, which is temperature in this example, is within the first predetermined operating range and whether the characteristic of the fluid proximate the second sensor is within the second predetermined operating range. Depending on where the operational component is disposed within the flow duct, whether the fluid characteristics are within their respective predetermined operating ranges provides insight into whether the operational component is working properly.

In yet other implementations, an overlap sensing region is defined along the circumferential direction where the first averaging sensor and the second averaging sensor physically overlap one another (e.g., as shown in FIG. 4). In such implementations, the operational component is disposed within the overlap sensing region along the circumferential direction and proximate the overlap sensing region along the radial direction and the circumferential direction. If the first averaging sensor is registering that the characteristic of the fluid is not within the first predetermined operating range and the second averaging sensor is registering that the characteristic of the fluid is not within the second predetermined operating range, at (210) generating the control action includes flagging the operational component. For instance, the controller may flag the operational component as a component failure and such information may be communicated to a maintenance crew.

For instance, continuing with the turbofan example above, suppose the operational component is a heat exchanger disposed at least partially within the high bypass flow passage. As noted above, the heat exchanger is positioned at least partially within the overlap sensing region. The arrangement of the first and second sensors may provide a high level of granularity as to whether the heat exchanger is working properly. In a first scenario, if the first averaging sensor is registering that the characteristic of the fluid is within the first predetermined operating range and the second averaging sensor is registering that the characteristic of the fluid is within the second predetermined operating range, the controller determines that the heat exchanger and any components disposed proximate the first and second sensors are working properly. In a second scenario, if the first averaging sensor is registering that the characteristic of the fluid is within the first predetermined operating range but that the second averaging sensor is registering that the characteristic of the fluid is not within the second predetermined operating range, the controller determines that the heat exchanger and any components disposed proximate the first sensor are working properly, but that one or more components disposed proximate the second sensor are not working properly, e.g., there may be a leak or blockage in one of the fluid conduits proximate the second sensor. In a third scenario, if the first averaging sensor is registering that the characteristic of the fluid is not within the first predetermined operating range but that the second averaging sensor is registering that the characteristic of the fluid is within the second predetermined operating range, the controller determines that the heat exchanger and any components disposed proximate the second sensor are working properly, but that one or more components disposed proximate the first sensor are not working properly. In a fourth scenario, if the first averaging sensor is registering that the characteristic of the fluid proximate the first sensor is not within the first predetermined operating range and the second averaging sensor is registering that the characteristic of the fluid proximate the second sensor is not within the second predetermined operating range, the controller determines that the heat exchanger is not working properly as both sensors are registering that the fluid characteristics are out of their respective predetermined operating ranges. Advantageously, as provided above, the overlapped arrangement of the two sensors provides three sensing regions, thereby providing more granularity relating to the fluid characteristics flowing within the flow passage. It will be appreciated that the heat exchanger may be positioned in other sensing regions, such as e.g., non-overlap sensing regions.

In some implementations, the system further includes a third averaging sensor extending along the circumferential direction within the flow passage (e.g., as shown in FIG. 5). The third averaging sensor at least partially physically overlaps at least one of the first averaging sensor and the second averaging sensor along the circumferential direction. For instance, as shown in FIG. 5, the third averaging sensor 123 physically overlaps the first sensor 121 and the second sensor 122. In such implementations, the method (200) further includes receiving a third signal from the third averaging sensor indicative of a characteristic of the fluid proximate the third averaging sensor. Accordingly, determining the component status of the operational component at (208) is based at least in part on the third signal. In some implementations, determining the component status of the operational component based at least in part on the third signal includes ascertaining whether the third averaging sensor is registering the characteristic of the fluid within a third predetermined operating range based at least in part on the third signal. The control action is generated at (210) based at least in part on whether the third averaging sensor is registering the characteristic of the fluid within the third predetermined operating range.

In some implementations, the flow duct defines an axial centerline. In such implementations, the first averaging sensor, the second averaging sensor, and the third averaging sensor of the system collectively form a sensing ring extending about the axial centerline along the circumferential direction. For instance, in FIG. 5 the first, second, and third sensors 121, 122, 123 collectively form a sensor ring extending about the axial centerline AC. In other exemplary implementations, the first averaging sensor, the second averaging sensor, and the third averaging sensor of the system collectively form a segment of a sensing ring.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for a flow duct defining a flow passage and an axial direction, a radial direction, and a circumferential direction, the system comprising:
   a first sensor extending along the circumferential direction within the flow passage; and
   a second sensor extending along the circumferential direction within the flow passage, wherein the first sensor extends along the circumferential direction such that at least a portion of the first sensor physically overlaps the second sensor along the circumferential direction and such that at least a portion of the first sensor does not physically overlap the second sensor along the circumferential direction.

2. The system of claim 1, wherein the first sensor and the second sensor both extend along the circumferential direction in the same or substantially the same plane along the axial direction.

3. The system of claim 1, wherein the system further comprises:
   a third sensor extending along the circumferential direction within the flow passage, wherein the third sensor extends along the circumferential direction such that the third sensor physically overlaps the first sensor along the circumferential direction and such that the third sensor physically overlaps the second sensor along the circumferential direction.

4. The system of claim 1, wherein the first sensor and the second sensor are averaging sensors.

5. The system of claim 1, wherein the flow duct is an annular bypass duct of a turbine engine.

6. The system of claim 1, wherein the first sensor and the second sensor define an overlap sensing region along the circumferential direction where the first sensor and the second sensor physically overlap one another along the circumferential direction, and wherein the first sensor defines a first sensing region along the circumferential direction where the first sensor and the second sensor do not overlap and the second sensor defines a second sensing region along the circumferential direction where the second sensor and the first sensor do not overlap, and wherein the system further comprises:
   a first operational component disposed within the flow passage and disposed at least partially within the overlap sensing region along the circumferential direction, and wherein the first operational component is positioned proximate the overlap sensing region along the axial direction and the radial direction.

7. The system of claim 6, further comprising:
   a second operational component in fluid communication with the first operational component; and
   a third operational component in fluid communication with the first operational component;
   wherein the second operational component and the third operational component are disposed within the flow passage and within one of the first sensing region and the second sensing region along the circumferential direction, and wherein the second operational component and the third operational component are positioned proximate one of the first sensing region and the second sensing region along the axial direction and the radial direction.

8. The system of claim 7, further comprising:
   a controller communicatively coupled with the first sensor and the second sensor, the controller configured to:
      receive a first signal from the first sensor indicative of a characteristic of the fluid proximate the first sensor;
      receive a second signal from the second sensor indicative of a characteristic of the fluid proximate the second sensor;
      determine a component status of one or more of the first, second, and third operational components based at least in part on the first signal and the second signal; and
      generate a control action based at least in part on the component status of the one or more of the first, second, and third operational components.

9. A method for determining a component status of an operational component disposed within a flow passage defined by a flow duct utilizing a system, the flow duct defining an axial direction, a radial direction, and a circumferential direction, the system comprising a first averaging sensor extending along the circumferential direction within the flow passage and a second averaging sensor extending along the circumferential direction within the flow passage, the method comprising:
   receiving a first signal from the first averaging sensor indicative of a characteristic of a fluid flowing through the flow passage proximate the first averaging sensor;
   receiving a second signal from the second averaging sensor indicative of a characteristic of the fluid flowing through the flow passage proximate the second averaging sensor, wherein the first averaging sensor and the second averaging sensor at least partially physically overlap one another along the circumferential direction;
   determining the component status of the operational component based at least in part on the first signal and the second signal; and
   generating a control action based at least in part on the component status of the operational component.

10. The method of claim 9, wherein the characteristic of the fluid of the first signal and the characteristic of the fluid of the second signal is at least one of a temperature and a pressure of the fluid.

11. The method of claim 9, wherein determining the component status of the operational component based at least in part on the first signal and the second signal comprises:
   ascertaining whether the first averaging sensor is registering the characteristic of the fluid within a first predetermined operating range based at least in part on the first signal; and
   ascertaining whether the second averaging sensor is registering the characteristic of the fluid within a second predetermined operating range based at least in part on the second signal;
   wherein the control action is generated based at least in part on whether the first averaging sensor is registering the characteristic of the fluid within the first predetermined operating range and whether the second averaging sensor is registering the characteristic of the fluid within the second predetermined operating range.

12. The method of claim 11, wherein an overlap sensing region is defined along the circumferential direction where the first averaging sensor and the second averaging sensor physically overlap one another, and wherein the operational component is disposed within the overlap sensing region along the circumferential direction and proximate the overlap sensing region along the radial direction and the circumferential direction, and wherein if the first averaging sensor is registering the characteristic of the fluid not within the first predetermined operating range and the second averaging sensor is registering the characteristic of the fluid not within the second predetermined operating range, generating the control action comprises flagging the operational component.

13. The method of claim 9, wherein the system further comprises a third averaging sensor extending along the circumferential direction within the flow passage, the third averaging sensor at least partially physically overlapping at least one of the first averaging sensor and the second averaging sensor along the circumferential direction, the method further comprising:
receiving a third signal from the third averaging sensor indicative of a characteristic of the fluid proximate the third averaging sensor;
wherein determining the component status of the operational component is based at least in part on the third signal, and wherein determining the component status of the operational component based at least in part on the third signal comprises:
ascertaining whether the third averaging sensor is registering the characteristic of the fluid within a third predetermined operating range based at least in part on the third signal, and wherein the control action is generated based at least in part on whether the third averaging sensor is registering the characteristic of the fluid within the third predetermined operating range.

14. The method of claim 13, wherein the flow duct defines an axial centerline, and wherein the first averaging sensor, the second averaging sensor, and the third averaging sensor collectively form a sensing ring extending about the axial centerline along the circumferential direction.

15. A system for a flow duct defining a flow passage for receiving a fluid therethrough, the flow duct further defining an axial direction, a radial direction, and a circumferential direction, the system comprising:
a first averaging sensor extending along the circumferential direction within the flow passage;
a second averaging sensor extending along the circumferential direction within the flow passage; and
a third averaging sensor extending along the circumferential direction within the flow passage, wherein the second averaging sensor extends along the circumferential direction such that at least a portion of the second averaging sensor physically overlaps the first averaging sensor along the circumferential direction and such that at least a portion of the second averaging sensor physically overlaps the third averaging sensor along the circumferential direction,
wherein at least a portion of the second averaging sensor does not physically overlap the first averaging sensor or the third averaging sensor along the circumferential direction, and wherein the first averaging sensor, the second averaging sensor, and the third averaging sensor are positioned proximate one another along the axial direction.

16. The system of claim 15, wherein the first averaging sensor, the second averaging sensor, and the third averaging sensor are positioned in the same plane along the axial direction.

17. The system of claim 15, further comprising:
a first sensor spaced from the first averaging sensor, the second averaging sensor, and the third averaging sensor along the radial direction, the first sensor extending along the circumferential direction within the flow passage; and
a second sensor spaced proximate the first sensor along the radial direction and spaced from the first averaging sensor, the second averaging sensor, and the third averaging sensor along the radial direction, the second sensor extending along the circumferential direction within the flow passage such that at least a portion of the second sensor physically overlaps the first sensor along the circumferential direction.

18. The system of claim 15, wherein the third averaging sensor extends along the circumferential direction such that at least a portion of the third averaging sensor physically overlaps the first averaging sensor along the circumferential direction.

19. The system of claim 15, wherein the first averaging sensor and the second averaging sensor define a first overlap sensing region along the circumferential direction where the first averaging sensor and the second averaging sensor physically overlap one another along the circumferential direction and the second averaging sensor and the third averaging sensor define a second overlap sensing region along the circumferential direction where the second averaging sensor and the third averaging sensor physically overlap one another along the circumferential direction, and wherein a first operational component is positioned at least partially within the first overlap sensing region along the circumferential direction, a second operational component is positioned at least partially within the second overlap sensing region along the circumferential direction, and wherein the first operational component is positioned proximate the first overlap sensing region along the axial direction and the radial direction and the second operational component is positioned proximate the second overlap sensing region along the axial direction and the radial direction.

20. The system of claim 19, further comprising:
a controller communicatively coupled with the first averaging sensor, the second averaging sensor, and the third averaging sensor, the controller configured to:
receive a first signal from the first averaging sensor indicative of a characteristic of the fluid flowing proximate the first averaging sensor;
receive a second signal from the second averaging sensor indicative of the characteristic of the fluid flowing proximate the second averaging sensor;
receive a third signal from the third averaging sensor indicative of the characteristic of the fluid flowing proximate the third averaging sensor;
determine a component status of at least one of the first operational component and the second operational component by:
ascertaining whether the first averaging sensor registered the characteristic of the fluid within a first predetermined operating range based at least in part on the first signal;

ascertaining whether the second averaging sensor registered the characteristic of the fluid within a second predetermined operating range based at least in part on the second signal;

ascertaining whether the third averaging sensor registered the characteristic of the fluid within a third predetermined operating range based at least in part on the third signal;

generate a control action based at least in part on the component status of at least one of the first operational component and the second operational component based at least in part on whether the first averaging sensor registered the characteristic of the fluid within the first predetermined operating range, whether the second averaging sensor registered the characteristic of the fluid within the second predetermined operating range, and whether the third averaging sensor registered the characteristic of the fluid within the third predetermined operating range.

* * * * *